United States Patent [19]
Le Sergent et al.

[11] Patent Number: 4,676,820
[45] Date of Patent: Jun. 30, 1987

[54] OPTICAL WAVEGUIDE FABRICATION METHOD

[75] Inventors: Christian Le Sergent, Marcoussis; Alain Drouart, Nemours, both of France

[73] Assignee: Compagnie Lyonnaise de Transmissions, Clichy, France

[21] Appl. No.: 831,112

[22] Filed: Feb. 19, 1986

Related U.S. Application Data

[63] Continuation of Ser. No. 538,425, Oct. 3, 1983, abandoned.

[30] Foreign Application Priority Data

Oct. 5, 1982 [FR] France ............................... 82 16674

[51] Int. Cl.$^4$ .............................................. C03B 25/02
[52] U.S. Cl. ........................ 65/3.12; 65/18.2; 65/70
[58] Field of Search ............. 65/3.12, 18.2, 60.2, 65/60.5, 70, 112; 427/163; 350/96.11, 96.12

[56] References Cited

U.S. PATENT DOCUMENTS

| | | | |
|---|---|---|---|
| 3,884,336 | 8/1984 | Huber et al. | 65/3.12 |
| 4,116,530 | 9/1978 | Bellavance et al. | 350/96.12 |
| 4,243,398 | 1/1981 | Nomura et al. | 65/3.12 |
| 4,262,995 | 4/1981 | Tangonan | 350/96.12 |

FOREIGN PATENT DOCUMENTS

| | | |
|---|---|---|
| 57-81213 | 5/1982 | Japan . |
| 1421401 | 1/1976 | United Kingdom . |
| 2066805 | 7/1981 | United Kingdom . |

*Primary Examiner*—S. Leon Bashore
*Assistant Examiner*—Michael K. Boyer
*Attorney, Agent, or Firm*—Kenyon & Kenyon

[57] ABSTRACT

A method of fabricating an optical waveguide comprising a plane substrate made of a material having a relatively low refractive index, a plane light propagation layer made of a material having a higher refractive index than the substrate, inserted between two strips of a material having a lower refractive index than its own, and a plane light confining layer of a material having a lower refractive index than the propagation layer. At least one of the layer, meaning either the propagation or the confinement layer, is obtained by causing to circulate in a tube of pure silica the vapors of a gaseous compound of silicon transformable into silica and of a gaseous compound of a doping agent transformable into one of its own oxides and heating said vapors sufficiently to obtain the deposit of a layer of doped silica having a refractive index different from that of the pure silica. Modifacations to the refractive indices can be obtained by either diffusing or implanting dopants, or alternatively by selective elimination of dopants.

5 Claims, 7 Drawing Figures

OPTICAL WAVEGUIDE FABRICATION METHOD

This application is a continuation, of application Ser. No. 538,425, filed Oct. 3, 1983 now abandoned.

FIELD OF THE INVENTION

This invention relates to a method of fabricating optical waveguides comprising a plane substrate made of a material having a relatively low refractive index, a plane light propagation layer of a material having a higher refractive index than the substrate, inserted between two strips of material having a refractive index lower than its own, and a plane light confining layer of a material having a lower refractive index than the propagation layer.

BACKGROUND OF THE INVENTION

Patent FR-A No.-2178176 discloses a fabrication method for a plane lightwave or optical waveguide whereby a plane glass substrate is coated by vapor deposition with a first layer of flame-hydrolyzed glass soot having a refractive index greater than that of the substrate, said glass soot being heated to sintering temperature such as to form a first outside surface coating parallel to the substrate surface, a second coat of glass soot being then deposited by flame-hydrolysis on said first outside layer to form a layer having a lower refractive index than the first layer, the two coatings, meaning the first layer and the second glass soot layer, being then heated together until sintering of the second coating.

The process just-mentioned does not provide fully satisfactory waveguides however, due to the presence of hydroxyl ions, formed during the hydrolysis reaction, in the layer intended to transmit the light signals, which cause certain significant wavelengths of the signal to be substantially absorbed, resulting in an excessive attenuation of signals per unit length of waveguide.

OBJECT OF THE INVENTION

It is the object of the present invention to provide plane optical waveguides having a low attenuation rate per unit of length, through simple, relatively low-cost methods.

SUMMARY OF THE INVENTION

In the fabrication method according to the invention, at least one of the deposition step—either of the plane light propagation layer of the plane confinement layer —involves the circulation through a tube of pure silica of vapors of a gaseous compound of silicon transformable into silica and of a gaseous compound of a doping agent tranformable into one of its own oxides and the heating of said vapor sufficiently to obtain the deposit of a coat of doped silica having a refractive index different from that of the pure silica.

In one embodiment, the method according to the invention involves the following steps.

(a) In a pure silica tube having a regular polygonal cross-section are made to circulate vapors of a gaseous compound of silicon transformable into silica, of a gaseous compound of a doping agent transformable into an oxide of said dopant, the dopant increasing the silica's refractive index, and of an oxidizing chemical compound. Said vapors are heated sufficiently to cause a first coat of doped silica to deposit on the inside walls of the tube.

(b) In same tube are made to circulate vapors of a gaseous compound of silicon transformable into silica, of a gaseous compound of a doping agent transformable into an oxide serving to increase the silica's refractive index, and of an oxidizing chemical compound, the proportion or the nature of said dopant being such however as to raise the refractive index of the silica to a lesser extent than before. Said vapors are heated sufficiently to cause a second coat of doped silica, having a lower refractive index than the first coat, to deposit onto said first coat.

(c) The walls of the tube are then sawed lengthwise such as to obtain several plates carrying two differently-doped layers of silica.

(d) The edges of said plates are covered with strips of a material having a lower refractive index than said first layer of doped silica.

The strips of lower refractive index material than the first coat of doped silica are preferably applied to the edges of the plates either by homogenizing the index of refraction in the area of the strips by fusion of the substance or vaporization of the dopants, or by doping the material in the area of said strips with agents lowering the refractive index.

In another embodiment, the method according to the invention involves the following steps.

(a) In a pure silica tube having a regular polygonal cross-section are made to circulate the vapors of a gaseous compound of silicon transformable into sililca, of a gaseous compound of a doping agent transformable into an oxide thereof, the dopant increasing the silica's refractive index, and of an oxidizing chemical compound. Said vapors are heated sufficiently to cause a first coat of doped silica to deposit on the inside walls of the tube.

(b) The walls of the tube are then sawed lengthwise such as to obtain several plane plates coated with doped silica having a greater refractive index than the pure silica.

(c) The edges of the doped silica are removed by electron-beam or laser beam techniques, or by selective etching after masking the center zone.

(d) The plates are each inserted into a second polygonal cross-section pure silica tube substantially similar to the tube from which said plates were cut.

(e) In said second tube are made to circulate vapors of a gaseous silicon compound transformable into silica, of a gaseous compound of a doping agent transformable into an oxide thereof, the proportion of the nature said dopant being such however as to impart a lesssr increase in the silica's refractive index. Said vapors are then heated sufficiently to cause a second coat of doped silica, having a slightly refractive index then the first coat, to deposit onto said first coat of said wafers as well as on the edges of said first coat.

In a third embodiment, the method according to the invention involves the following steps.

(a) In a pure silica tube having a regular polygonal cross-section are made to circulate the vapors of a gaseous compound of silicon transformable into silica, of a gaseous compound of a doping agent transformable into an oxide thereof, the dopant decreasing the silica's refractive index, and of an oxidizing chemical compound. Said vapors are heated sufficiently to cause a first coat of doped silica to deposit on the inside walls of the tube.

(b) The walls of the tube are then sawed lengthwise such as to obtain several plane plates coated with doped silica having a lower refractive index than that of the pure silica.

(c) The refractive index of the center zone of each plate is then increased by vaporizing the dopant by means of an electron beam or a laser beam, or by implanting or diffusing therein a different dopant increasing the silica's refractive index.

(d) The plates are inserted into a second polygonal cross-section pure silica tube substantially similar to the tube from which said plates were cut.

(e) In said second tube are made to circulate vapors of a gaseous silicon compound transformable into silica, of a gaseous compound of a doping agent transformable into an oxide thereof, the proportion or the nature of said dopant being such as to yield a deposition layer having a lower refractive index than that obtained in step (c), and of an oxidizing chemical compound. Said vapors are heated sufficiently to cause a second layer of silica to deposit onto the previous plate layer and on the edges thereof, said second layer having a refractive index slightly lower than that of said first layer.

In a fourth embodiment, the method according to the invention involves the following steps.

(a) A dopant boosting the refractive index of the silica is applied by diffusion or implantation to the center zone of the plane plate of pure silica.

(b) The plate is inserted into a pure silica tube.

(c) In the pure silica tube are made to circulate the vapors of a gaseous silicon compound transformable into silica, of a gaseous compound of a doping agent transformable into an oxide thereof, the proportion or the nature of said dopant being such as to yield a deposition layer having a lower refractive index than that obtained in step (a), and of an oxidizing chemical compound. Said vapors are heated sufficiently to cause a second layer of doped silica to deposit onto the previous layer and on the edges thereof said second layer having a refractive index slightly lower than that of said first layer.

The various steps in the procedures according to the invention for fabricating an optical waveguide will be more readily understood and some of the optical circuits in which such waveguides can be put to use will be disclosed on reading the following description with reference to the accompanying drawings, in which:

DETAILED DESCRIPTION OF THE INVENTION

Figure 1:
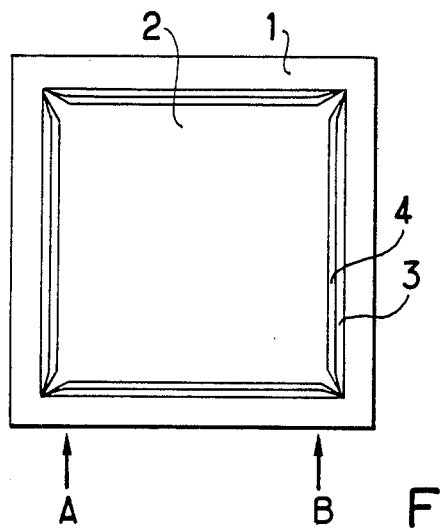
FIG. 1 is a cross-sectional view of a square tube of pure silica on the inside walls of which have been deposited layers of doped silica during the fabrication of a waveguide.

As shown in FIG. 1, the tube 1 of pure silica whose refractive index is $n_0$, having a squar cross section surrounding an open channel 2, is provided with a first inside coating deposition layer 3 of doped silica having an index of refraction $n_1$ slightly higher than $n_0$, being for example a silica film doped with germanium oxide, having a thickness of between 1 and 60 microns. It is secondly provided with a second inside coating 4 of doped silica having an index of refraction $n_2$ less than that of the first coating, being for example a film of silica doped with a smaller proportion of germanium oxide. The thickness of the layers in the drawing have been considerably exaggerated for greater clarity.

In order to obtain the flat or plane waveguides, the walls of the tube are then sliced in directions A and B, parallel to its sides.

Limiting strips with refraction index $n_3 < n_1$ are then formed on the edges of the layer having refractive index $n_1$, laterally confining the light beam within the said layer with refractive index $n_1$. This can be done for example by homogenizing the index throughout the limiting strips by melting the material itself or by evaporative removal of the dopants, depending on the depth of the layer, using either a $CO_2$ laser or an electron beam of suitable power, or by doping the limiting strips with index-lowering agents such as boric anhydride or fluorine into the two $n_1$ and $n_2$ index layers, either by diffusion or by ion implantation.

Alternatively, once the first, $n_1$ index propagation layer has been deposited on the inside wall of the square-section tube and the tube has been cut into plates, said layer can be removed from the length of the limiting strips by electron beam or laser machining, or by selective chemical etching performed after masking the wave propagation path. Following, the series of $n_2 \geq n_1$ layers can be deposited by putting the plates into another tube within which deposition can take place as above.

As another alternative, given a silica plate onto which a layer of index $n_1 < n_0$ has been deposited with the help of a boric anhydride or fluorine dopant, it is possible to adjust the index throughout the propagation path to a value $n_4 > n_1$ either by evaporating the dopant with a laser or electron beam, or by implanting or diffusing a complementary, index-boosting dopant such as a phosphorus compound or germanium oxide. A layer having refractive index $n_2 < n_4$ can then be deposited onto the plate surface by putting the plate into another tube and carrying out the deposition as above.

A still further alternative would be to start from a pure silica plate and diffuse or implant ions in the wave propagation path, boosting the index to a level $n_1 > n_0$, then coat the entire plate with a layer of silica doped with an agent boosting the index to a value not exceeding $n_2 < n_1$ (or lowering the index to said value).

Figure 2A:
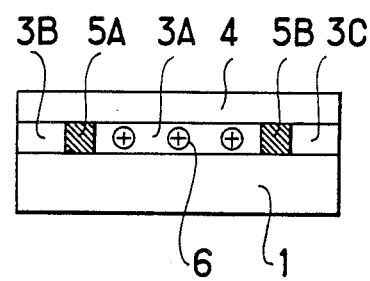
FIGS. 2A and 2B are cross-sectional and horizontally and longitudinally taken cross-sectional views respectively of a waveguide fabricated by the method according to the invention.
Figure 2B:
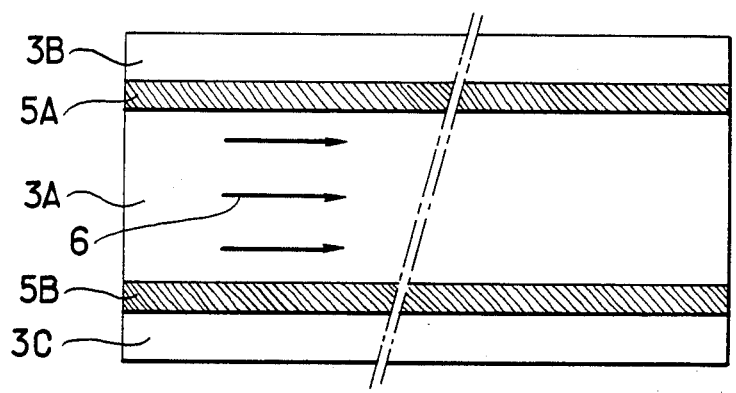

The several procedures outlined above will yield plane optical waveguides with a structure s depicted in FIGS. 2A and 2B. The substrate 1 of pure silica with index $n_0$ is coated with a propagation layer 3A having a refractive index $n_1 > n_0$ and laterally limited by confinement layers 5A, 5B, having an index $n_2 < n_1$, separating it from the edges 3B, 3C, having the same index $n_1$. Layer 3A is covered by upper layer 4 with index $n_2 < n_1$. The light rays travelling through the propagation layer perpendicularly to the plane of FIG. 2A and parallel to the plane of FIG. 2B are symbolized by the arrows 6.

Figure 3:
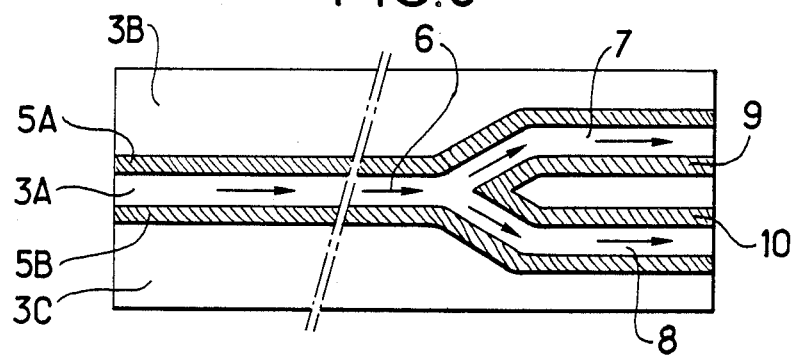
FIG. 3 is a horizontally and longitudinally taken cross-sectional view of a waveguide enabling the division of a light beam into two branches.

FIG. 3 shows a waveguide component serving to divide the light beam 6. The propagation layer 3A is split into two branches 7, 8, altogether limited by confinement strips 5A, 5B and 9, 10.

Figure 4:
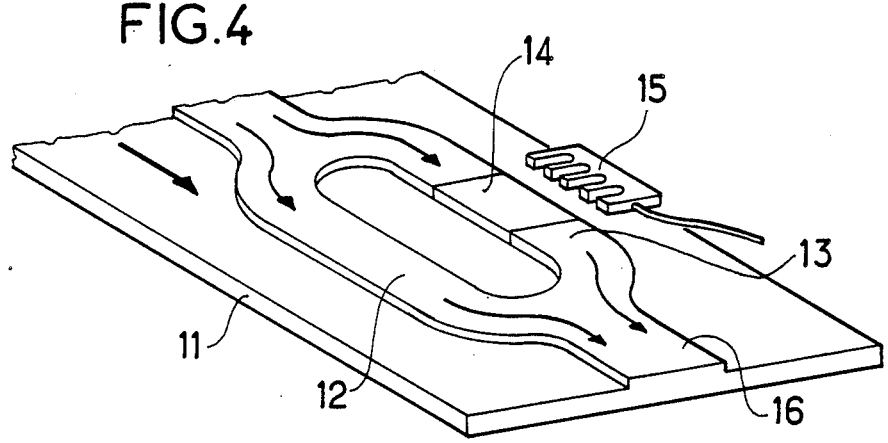
FIG. 4 depicts a two-branched waveguide one of the branches whereof, being provided with a control electrode, enables phase-shifting of the half of the optical signal passing therethrough and therefore seves as an amplitude attenuator or modulator.
Figure 5:
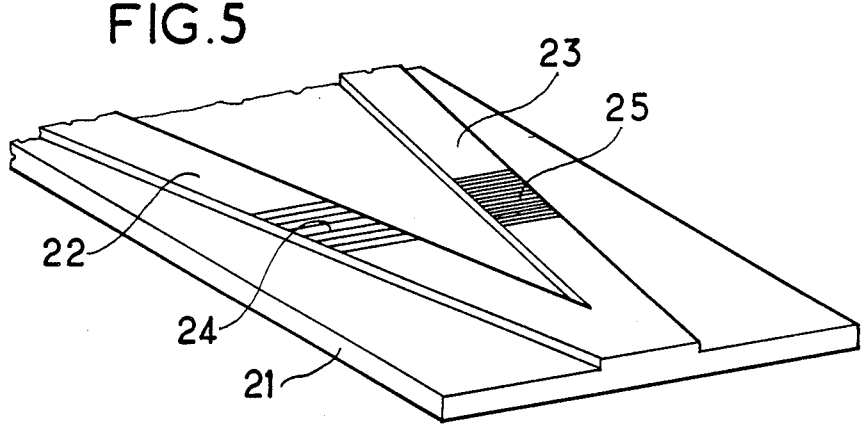
FIG. 5 depicts a two-branched waveguide each of the branches whereof is provided with a diffraction netword, enabling the separation of two frequencies of the initial lightwave.
Figure 6:
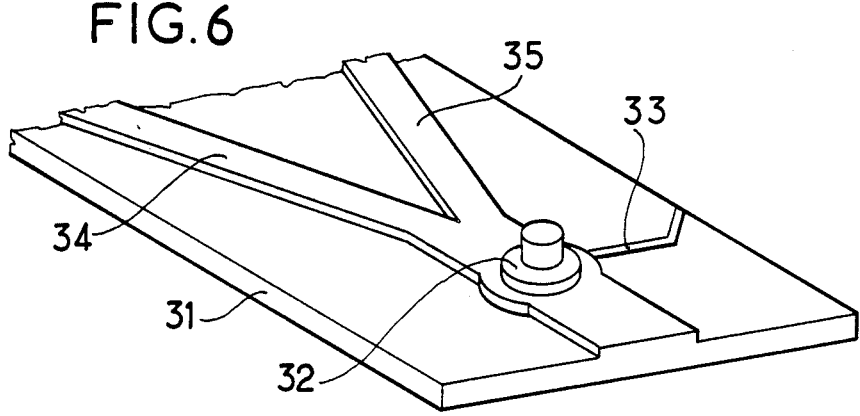
FIG. 6 depicts a waveguide provided with a photodiode light emitter.

In FIGS. 4, 5 and 6, the confinement strips and the upper layer with a lower index than that of the propagation layer are not explicitly shown, for purposes of clarity.

In the waveguide components 11 of FIG. 4, the propagation layer is divided into two branches 12, 13. Branch 13 comprises a deposit of zinc oxide 14 whose index is controlled by a metal electrode 15 depsited by vacuum sputtering.

The optical signal being divided into two branches and the signal passiing through branch 13 being subject to electric control, it becomes possible to obtain in the waveguide continuation 16 a phase shifting of one half of the optical signal, which may be added to or subtracted from the other half. Consequently, an amplitude modulator or attenuator is thereby provided, controllable via a voltage application.

In the waveguide component 21 of FIG. 5, propagation layer branches 22, 23 have been provided, by etching, with diffraction networks consisting of closely-spaced stripe lines 24 and 25.

By using differently spaced stripes, it is possible to separate two lightwave frequencies and to allow one of the two to pass through only one of the two branches.

The waveguide component 31 of FIG. 6 is provided with a photodiode 32, which may be either a receiver or an emitter and may be coupled to a waveguide either by drilling or by local deposition of gallium arsenide or indium phosphide. The photodiode is controlled through the metal film 33. The propagation layer divides into two branches 34, 35.

By combining a variety of plane optical waveguide components such as those described above, it is possible to obtain a broad range of integrated optical circuits.

I claim:

1. A method of fabricating an optical waveguide of rectangular cross section, the method comprising the following steps:
   (a) providing a pure silica tube having a longitudinal axis and a regular polygonal cross section;
   (b) flowing through said tube vapors of
      (1) a gaseous compound of silicon transformable into silica,
      (2) a gaseous compound of a first doping agent transformable into an oxide capable of increasing the refractive index of the silica, and
      (3) an oxidizing chemical compound;
   (c) heating said vapors sufficiently to cause a first layer of doped silica to deposit on the inside walls of said tube;
   (d) flowing through said tube vapors of
      (1) a gaseous compound of silicon transformable into silica;
      (2) a gaseous compound of a second doping agent transformable into an oxide serving to increase the refractive index of the silica by an amount less than the increased refractive index provided by said first doping agent, and
      (3) an oxidizing chemical compound;
   (e) heating the vapors of step (d) sufficiently to cause a second layer of doped silica to deposit on said first layer, said second layer having a lower refractive index than said first layer;
   (f) slicing the walls of the tube into plates parallel to the longitudinal axis, each of said plates comprising a substrate of pure silica coated with said first layer of doped silica having a refractive index higher than the refractive index of the substrate, and the first layer being coated with said second layer of doped silica having a refractive index lower than the refractive index of said first layer; and
   (g) creating only, on the sliced edges of each plate, flat strips having a refractive index lower than the refractive index of said first layer of doped silica, said step of creating flat strips comprising treating a strip of the plate material along each sliced edge so as to lower the refractive index of the strip below the refractive index of said first layer.

2. A method of fabricating an optical waveguide according to claim 1 wherein said second doping agent comprises the same material as said first doping agent, the second doping agent being provided in a different proportion to the gaseous compound of silica than the first doping agent.

3. A method of fabricating an optical waveguide according to claim 2 wherein step (g) comprises:
selectively melting strips of the plate material along the sliced edges of the plate to homogenize the index of refraction in said strips.

4. A method of fabricating an optical waveguide according to claim 2 wherein step (g) comprises:
vaporizing the dopants in said first and second layers of the plate selectively in the strips along the sliced edges of the plate to homogenize the index of refraction in the region of said strips.

5. A method of fabricating an optical waveguide according to claim 2 wherein step (g) comprises:
selectively doping strips of said first and second layers of the plate along the sliced edges of said plate with an index lowering agent.

* * * * *